Sept. 1, 1925.
J. C. W. HINSHAW
Re. 16,157
TRAILER TRUCK
Original Filed July 28, 1922 2 Sheets-Sheet 1
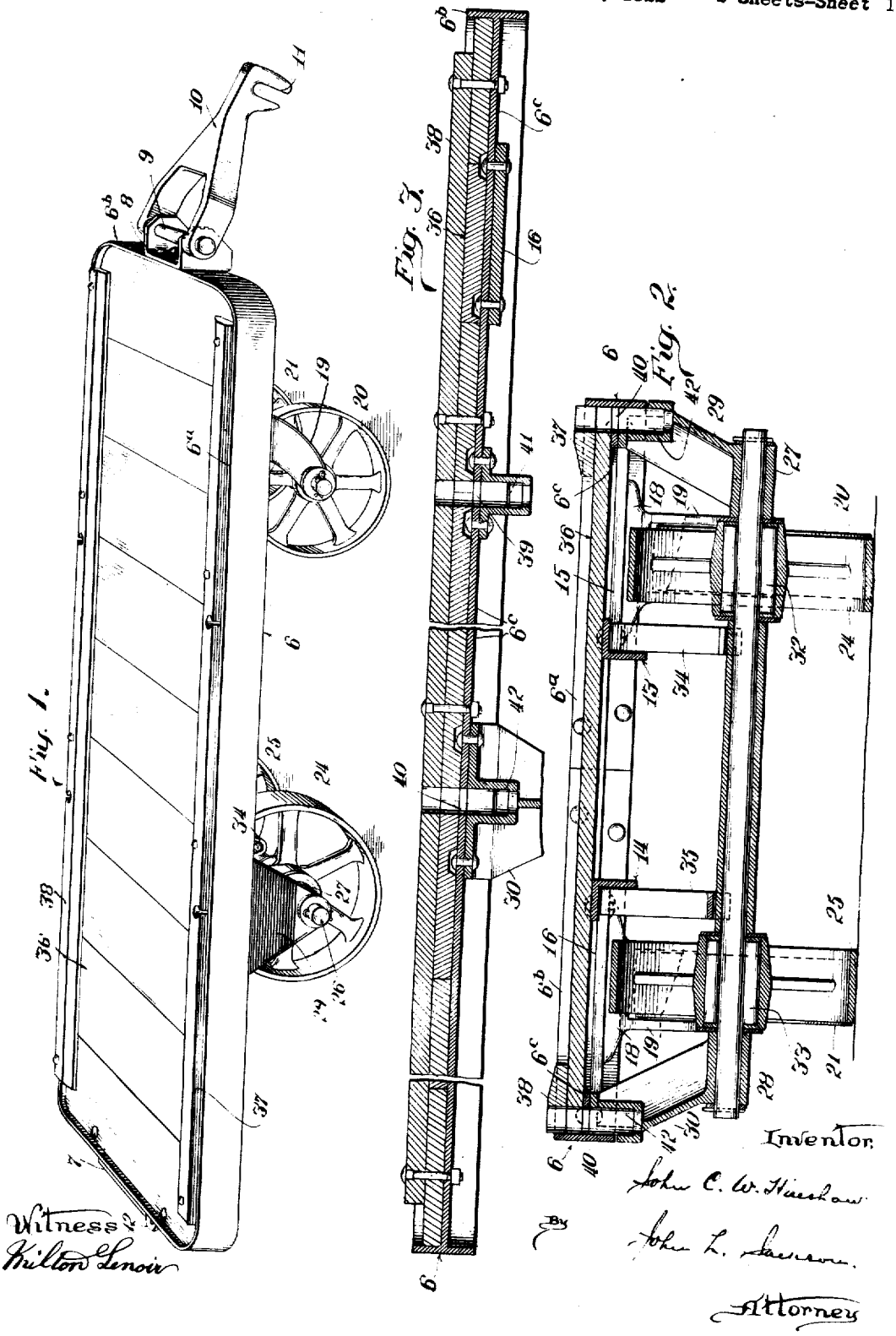

Sept 1, 1925.
J. C. W. HINSHAW
Re. 16,157
TRAILER TRUCK
Original Filed July 28, 1922 2 Sheets-Sheet 2
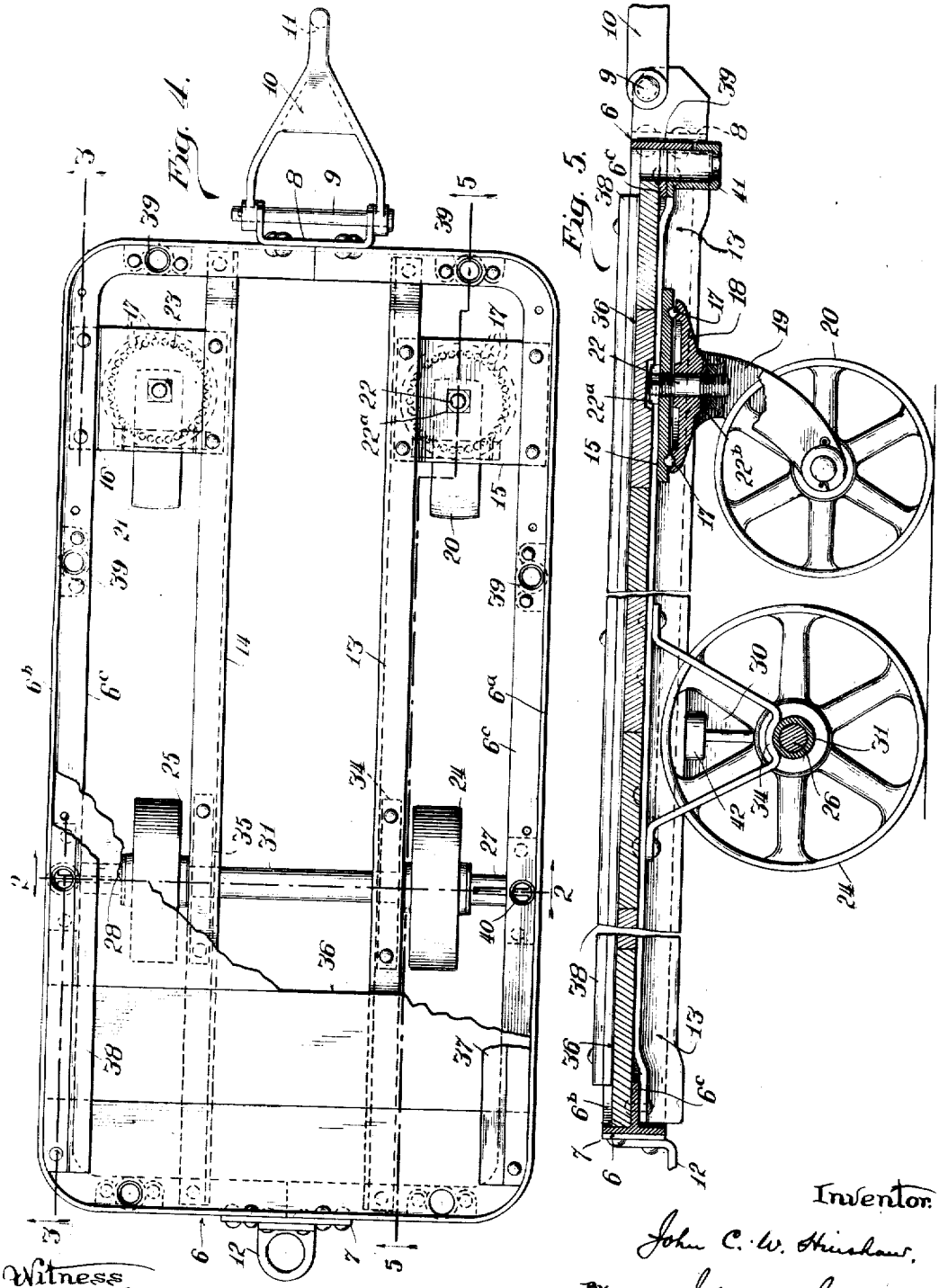
Witness
Milton Senoir
Inventor
John C. W. Hinshaw,
By John L. Jackson,
Attorney Reissued Sept. 1, 1925. Re. 16,157

UNITED STATES PATENT OFFICE.

JOHN C. W. HINSHAW, OF CHICAGO, ILLINOIS, ASSIGNOR TO MERCURY MANUFACTURING COMPANY, OF CHICAGO, ILLINOIS, A CORPORATION OF ILLINOIS.

TRAILER TRUCK.

Original No. 1,501,280, dated July 15, 1924, Serial No. 578,095, filed July 28, 1922. Application for reissue filed February 19, 1925. Serial No. 10,437.

*To all whom it may concern:*

Be it known that I, JOHN C. W. HINSHAW, a citizen of the United States, and a resident of Chicago, in the county of Cook and State of Illinois, have invented certain new and useful Improvements in Trailer Trucks, of which the following is a specification, reference being had to the accompanying drawings.

My invention relates particularly to trucks of the type known as trailer trucks, or trucks adapted to be coupled together in series so that they may be drawn by a small tractor, although many of the improved features hereinafter pointed out may be applied to trucks of other types. The object of my invention is to provide certain structural improvements by which the frame of the truck will be made very strong without being unduly heavy, and by which the platform of the truck will be low down while at the same time it will be supported by wheels of comparatively large diameter, thereby making the work of loading and unloading the truck easier, increasing its stability, and making it run more easily, so that less power is required to haul it. Also to provide a construction by which the principal parts of the truck may be assembled in separate halves which may afterwards be easily united so that the parts can be stored, or packed for shipment, more conveniently and with great economy as to space. Other meritorious features of my improved truck will be pointed out in connection with the description thereof. What I regard as new and of my invention will be set forth in the claims.

In the accompanying drawings,—

Fig. 1 is a perspective view of my improved truck;

Fig. 2 is a vertical cross-section thereof on line 2—2 of Fig. 4;

Fig. 3 is an enlarged longitudinal vertical section on line 3—3 of Fig. 4 partly broken away;

Fig. 4 is a plan view, part of the platform being broken away; and

Fig. 5 is a longitudinal vertical section on line 5—5 of Fig. 4 partly broken away.

My improved truck comprises a rectangular frame 6, preferably rounded at the corners, which frame is composed of two U-shaped T iron members $6^a$, $6^b$, disposed so that one of their flanges extends horizontally inward, the end portions of which fit together and are rigidly secured to each other by connecting plates 7, 8 which overlap them and are riveted in place. The connecting plate 8 is preferably U-shaped, as shown in Fig. 4, and supports a bolt 9 by which a yoke 10 is pivotally connected with said plate so as to swing vertically. The yoke 10 is provided with a hook 11, as shown in Fig. 1, for coupling the truck to the rear end of a similar truck. The connecting plate 7 has secured to it a ring plate 12, as shown in Fig. 4, adapted to receive the hook of an adjoining truck for coupling purposes. The end portions of each of the members $6^a$, $6^b$ are connected together and braced by longitudinally-extending angle bars 13, 14, as best shown in Figs. 2 and 4, the end portions of said angle bars being deflected downwardly far enough so that they may extend under the horizontal flange $6^c$ of the T bar member to which they are respectively connected, as best shown in Fig. 5.

Near the forward end of the truck are provided two horizontal caster wheel supporting plates 15, 16, the plate 15 being connected with the horizontal flange $6^c$ of the member $6^a$ and with the horizontal flange of the angle bar 13, while the plate 16 is similarly connected with the member $6^b$ and the angle bar 14, so that said plates lie approximately in the horizontal plane of the flanges with which they are connected. These plates are provided at their under sides with a circular race way adapted to receive a series of anti-friction balls 17 which are interposed between said plates and circular bearing plates 18 arranged below the plates 15, 16 respectively. The bearing plates 18 are carried at the upper ends of yokes 19 in which are mounted front wheels 20, 21, and said bearing plates are connected with the plates 15, 16 to swing about vertical axes by bolts 22, 23, in the form of rods threaded at both ends and provided with nuts $22^a$, $22^b$ above the plates 15, 16 and below the plates 18 respectively. The upper ends of these rods are screwed into the plates 15, 16, so that they are locked firmly in position by the nuts $22^a$ as shown in Fig. 5. The bolts 22, 23 serve merely to hold said plates together while the anti-friction balls provide a bearing of large diameter between said plates coaxial with said bolts. Thus the wheels 20, 21 are in effect caster wheels which adapt themselves to the direction in which the truck is being hauled. The rear portion of the truck is supported by wheels 24, 25 which, as best shown in Fig. 2, are mounted upon an axle 26, the end portions of which are mounted in bearings 27, 28 carried by brackets 29, 30 secured to the members $6^a$, $6^b$ at opposite sides of the truck, and extending downward and inward therefrom, as best shown in Fig. 2, so that neither said bearings nor the ends of the axle 26 project beyond the sides of the frame, and, therefore, are not apt to hit packages of freight or other articles past which the truck may be moving. Between the wheels a spacer sleeve 31 is mounted on the axle 26 to hold the wheels the proper distance apart, and preferably the wheels 24, 25 are provided with roller bearings 32, 33 as shown in Fig. 2. The angle bars 13, 14 are supported over the axle 26 by hangers 34, 35 which are secured to said angle bars and extend downward far enough to bear upon the upper portion of the sleeve 31, as best shown in Figs. 2 and 5.

It will be noted that except for the connecting plates 7, 8, the rear axle and wheels, and the spacer sleeve 31, the truck structure is composed of two similar complementary units, to wit, the members $6^a$, $6^b$ and the duplicate parts attached thereto. In order to complete the truck, therefore, it is necessary only to secure the two halves together, put the rear axle and wheels in place and then apply the platform. My improved truck may, therefore, be left in a "knock down" condition for storage purposes or for shipment, in which condition it occupies less space, is more easily stored, and is less likely to be damaged. No special tools are necessary to assemble the parts, and the work may be done by any ordinary mechanic in a very short time.

The truck is completed by fitting a platform or deck 36 upon the upper surface of the horizontal flange $6^c$ and the horizontal flange of the bars 13, 14, as shown in the drawings, and preferably by applying also a pair of longitudinally-extending side strips 37, 38 along the opposite side margins of the frame. These side strips, which are beveled as shown in Fig. 2, serve to tilt the packages placed on the truck slightly toward the center thereof, so that they are not apt to fall off. The use of such strips is well known in the art.

For the purpose of providing means for supporting upright stakes at various points around the margins of the truck, the horizontal flange $6^c$ is bored at suitable intervals adjacent to the vetrical flange of the truck frame, as shown at 39, 40 in Fig. 1, and registering holes are also provided in the platform. Underneath the holes 39 the flange $6^c$ is provided with pockets 41 which are riveted thereto, as shown in Fig. 3, and under the holes 40 the brackets 29 are provided with pockets 42. The lower ends of the stakes fit in these pockets 41, 42, so that they are firmly secured in an upright position, and their upper ends are supported against outward deflection by the adjacent vertical flange of the truck frame.

By making the frame of the truck of bars having inwardly extending horizontal flanges, mounting the platform on such flanges, and connecting the caster wheel supporting plates to them and to the horizontal flanges of the bars 13, 14, the wheel supports are brought very near to the horizontal plane of the platform so that caster wheels of larger diameter may be used without raising the platform to an undesirable height from the floor, and this is an important advantage in trucks of this description. In fact, in my improved construction I have found it practicable to use 10 inch wheels and still keep the platform no more than 14 inches from the ground. Furthermore, the T bar construction enables me to use lighter material, since the vertical flanges of the T bars strongly resist vertical strains, and the horizontal flange provides adequate support against lateral strains. The longitudinally-extending angle irons support the intermediate portion of the platform on their horizontal flanges, which are uppermost, and said angle irons also strengthen and support the end portions of the truck, and at the same time they serve to carry the inner margins of the plates 15, 16 which form the upper bearings for the caster wheels.

What I claim as my invention and desire to secure by Letters Patent, is—

1. A truck comprising a substantially rectangular metal frame having integral vertical and horizontal flanges, the latter flange extending inwardly, longitudinally extending bars each having flanges disposed horizontally and vertically, their horizontal flanges being connected with the horizontal flange at opposite end portions of said frame, caster wheel supports each connected with the horizontal flange of one of said bars and with the horizontal flange of the adjacent side portion of the frame, and lying approximately in the horizontal plane of said flanges, caster wheels carried by said supports, and a platform resting on the upper surfaces of said horizontal flanges.

2. A truck comprising a substantially rectangular T-iron frame having vertically disposed upper and lower flanges, a flange extending horizontally inward at the side and end portions of the frame, longitudinally extending bars each having a horizontal flange, and a vertical flange extending downward from such horizontal flange, the horizontal flanges of said bars being connected to the horizontal flange at the opposite end portions of said frame, caster wheel supports each connected with the horizontal flange of one of said bars and with the horizontal flange of the adjacent side portion of the frame and lying approximately in the horizontal plane of said flanges, and a platform resting on the upper surfaces of said horizontal flanges.

3. A truck comprising a substantially rectangular metal frame having integral vertical and horizontal flanges, said flanges extending respectively downwardly and inwardly from their juncture, bars each having flanges disposed horizontally and vertically, their horizontal flanges being uppermost and being connected with the horizontal flange at opposite portions of the frame, horizontal plates located between the vertical flanges of said bars and the vertical flange of the frame, said plates being connected with the horizontal flange of one of said bars and with the horizontal flange of the adjacent portion of the frame, and lying approximately in the horizontal plane of said flanges, caster wheels having bearing plates arranged below and pivotally connected with said horizontal plates, and a platform resting on the upper surfaces of said horizontal flanges.

4. A truck comprising a substantially rectangular metal frame having integral vertical and horizontal flanges, said flanges extending respectively upwardly and inwardly from their juncture, longitudinally extending bars each having flanges disposed horizontally and vertically, their horizontal flanges being uppermost and being connected with the horizontal flange at the end portions of said frame, said horizontal flanges being arranged to serve as supports for a platform, horizontal bearing plates each bearing against the horizontal flange of one of said bars and secured thereto and to the horizontal flange at the adjacent side portion of the frame, and lying approximately in the horizontal plane of said flanges, and caster wheels having bearings on the under sides of said plates respectively.

5. A truck comprising a substantially rectangular T-iron frame having vertically disposed upper and lower flanges, a flange extending horizontally inward at the side and end portions of the frame, longitudinally extending bars each having a horizontal flange, and a vertical flange extending downward from such horizontal flange, the horizontal flanges of said bars being uppermost and being connected with the horizontal flange at the end portions of said frame, said horizontal flanges being arranged to serve as supports for a platform, horizontal plates each bearing against the under face of the horizontal flange of one of said bars and secured thereto and to the horizontal flange of said frame, and lying approximately in the horizontal plane of said flanges, and caster wheels having bearings on the under sides of said plates respectively.

6. A truck comprising a substantially rectangular metal frame having integral vertical and horizontal flanges, the latter flange extending inwardly, an angle bar having flanges disposed horizontally and vertically, its horizontal flange being uppermost and being connected with the horizontal flange at opposite portions of the frame, said horizontal flanges being arranged to serve as supports for a platform a caster wheel support located between said vertical flanges, said support being connected with and bearing against the under face of the horizontal flange of said bar and the horizontal flange of the adjacent portion of the frame, and lying approximately in the horizontal plane of said flanges, and a caster wheel carried by said support.

7. A truck comprising a substantially rectangular metal frame having integral vertical and horizontal flanges, the latter flange extending horizontally inward, brackets separately connected with the horizontal flanges at the opposite side portions of said frame and extending obliquely downwardly and inwardly from the side portion with which each is respectively connected, a unitary axle having its end portions mounted in said brackets, wheels mounted on said axle between said brackets, and a platform mounted on the horizontal flange of said frame.

8. A truck comprising a substantially rectangular T iron frame having a flange extending horizontally inward at the side and end portions thereof, brackets connected with the opposite side portions of said frame and extending downwardly and inwardly therefrom, an axle mounted in said brackets, wheels mounted on said axle, a spacer sleeve on the axle between said wheels, longitudinally extending bars each having flanges disposed horizontally and vertically, their horizontal flanges being connected with the horizontal flange at the end portions of said frame, hangers connected with said bars and adapted to bear against said sleeve for supporting said bars thereon, and a platform supported by the horizontal flange of said frame and by said bars.

9. A truck comprising a substantially rectangular metal frame having an integral horizontal flange and a vertical flange extending upwardly from the horizontal flange, the latter flange extending horizontally inward and having a series of stake receiving holes adjacent to said vertical flange, and pockets secured to the under side of said horizontal flange under said holes to receive the lower ends of the stakes, whereby said vertical flange supports the stakes against outward deflection.

10. A truck frame comprising two substantially U-shaped T iron members, longitudinally-extending bars connecting the end portions of each of said members together, and means fixedly connecting said two members together to form a substantially rectangular frame.

11. A truck comprising a substantially rectangular frame, brackets secured to the side members of the frame and having axle bearings and stake receiving pockets carried by said brackets under the side portions of said frame and registering with openings therein.

12. A truck comprising a substantially rectangular T iron frame having stake receiving holes in the horizontal flanges at opposite sides of said frame, brackets secured to said horizontal flanges and having stake receiving pockets adapted to register with said holes, and axle bearings carried by said brackets.

JOHN C. W. HINSHAW.

Certificate of Correction.

It is hereby certified that in Reissue Letters Patent No. 16,157, granted September 1, 1925, upon the application of John C. W. Hinshaw, of Chicago, Illinois, for an improvement in "Trailer Trucks," errors appear in the printed specification requiring correction as follows: Page 3, line 95, claim 7, for the word "flanges" read *flange;* same page, line 105, claim 8, strike out "T iron" and insert instead the word *metal;* and that the said Letters Patent should be read with these corrections therein that the same may conform to the record of the case in the Patent Office.

Signed and sealed this 13th day of October, A. D. 1925.

[SEAL.]

KARL FENNING,
*Acting Commissioner of Patents.*